US005967586A

United States Patent [19]

Duffy et al.

[11] Patent Number: 5,967,586

[45] Date of Patent: Oct. 19, 1999

[54] ONE STEP ADJUSTABLE DECK LID HINGE

[75] Inventors: Michael J. Duffy, Penetanguishene; Robert W. Ladouceur, Victoria Harbour, both of Canada

[73] Assignee: M & C Corporation, Warren, Mich.

[21] Appl. No.: 08/901,736

[22] Filed: Jul. 28, 1997

[51] Int. Cl.[6] .................................................... B62D 25/10

[52] U.S. Cl. ................................ 296/76; 16/245; 16/235

[58] Field of Search ................................ 296/76, 146.11; 16/235, 242, 245

[56] References Cited

U.S. PATENT DOCUMENTS

| | | | |
|---|---|---|---|
| 4,893,863 | 1/1990 | Skonieczny et al. | 296/76 |
| 5,029,930 | 7/1991 | Ihrke et al. | 296/76 |
| 5,074,609 | 12/1991 | Dear | 296/76 |
| 5,158,333 | 10/1992 | Saville | 296/76 |
| 5,195,796 | 3/1993 | Wampler, II | 296/76 |
| 5,365,639 | 11/1994 | Lewkoski | 16/224 |
| 5,419,012 | 5/1995 | Lewis | 16/306 |
| 5,584,099 | 12/1996 | Westerdale | 296/76 X |

*Primary Examiner*—Joseph D. Pape
*Attorney, Agent, or Firm*—Brooks & Kushman P.C.

[57] ABSTRACT

An adjustable hinge assembly and method for mounting a hinge strap of a deck lid to a vehicle body is disclosed. The assembly and method permit rapid adjustment of the deck lid to properly fit the vehicle body. The assembly includes a hinge box, a pivot pin, and an adjustment screw. The hinge box mounts to the vehicle body and has spaced apart sides. The sides of the hinge box are shaped to provide aligned adjustment slots formed on a tangent to an arc centered at substantially the deck lid striker. The pivot pin extends through the adjustment slots and is slidable therealong. The hinge strap has a proximal end for pivotal connection to the pivot pin. The adjustment screw extends within the hinge box and is connected thereto. The adjustment screw is threadingly engaged with the pivot pin. Rotation of the adjustment screw causes the pivot pin to slide along the adjustment slots thereby vertically adjusting of the position of the deck lid in relation to the vehicle body while maintaining the proper relationship with the deck lid striker.

11 Claims, 4 Drawing Sheets

FIG. 5
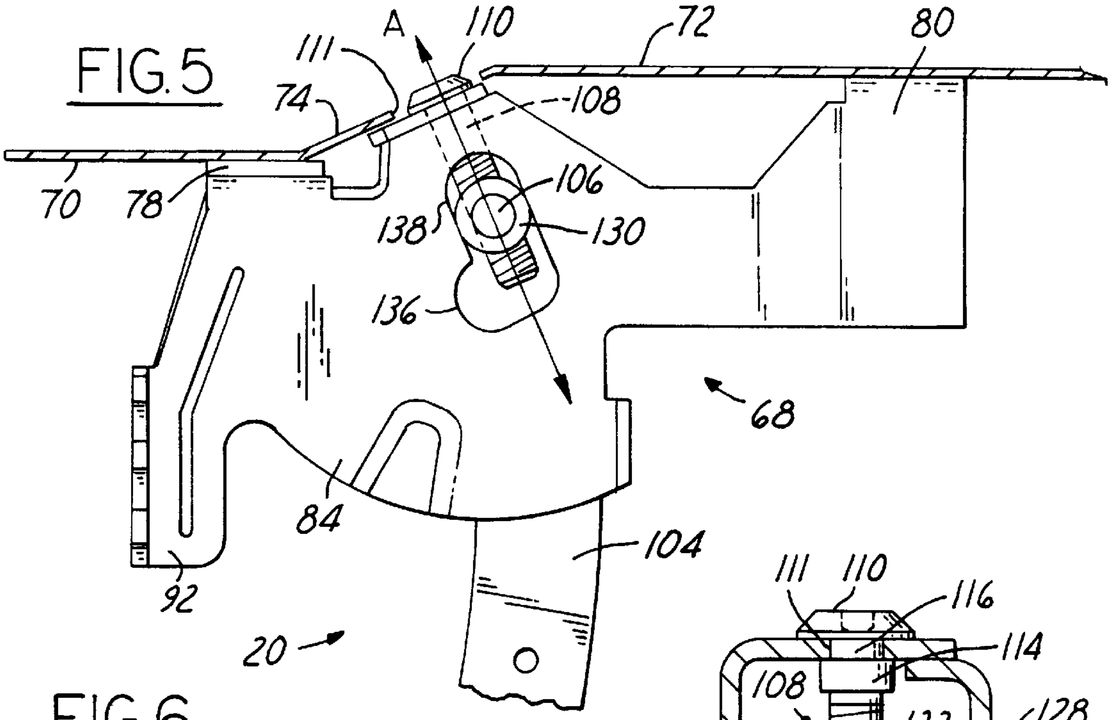
FIG. 6
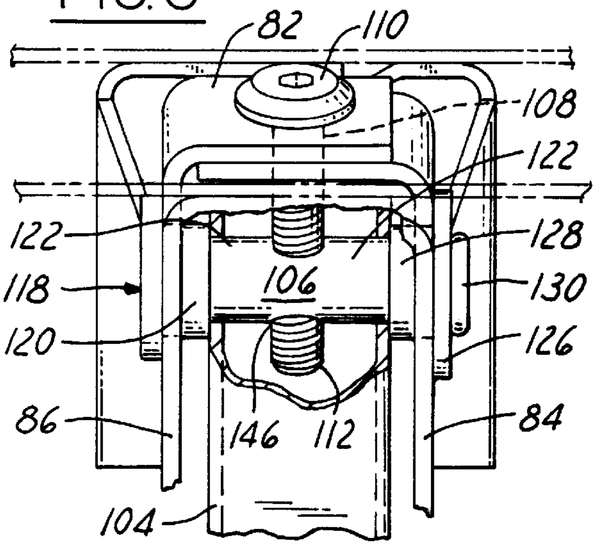
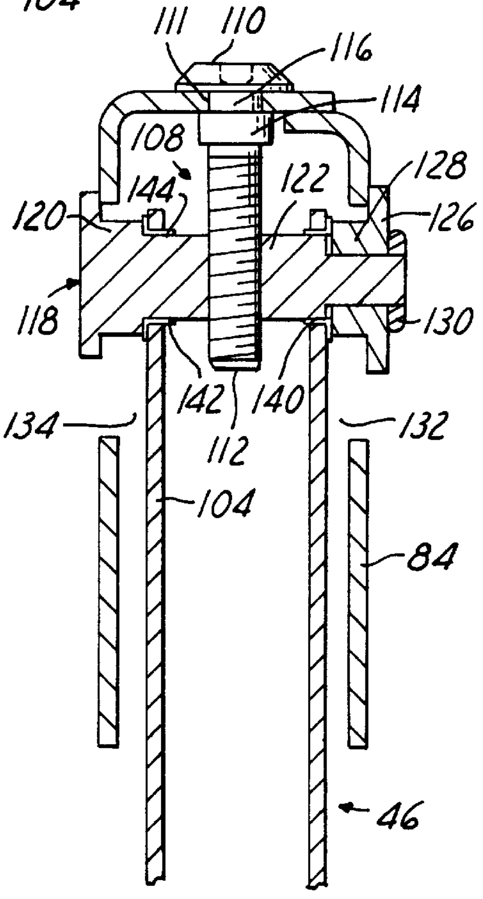
FIG. 7
FIG. 8
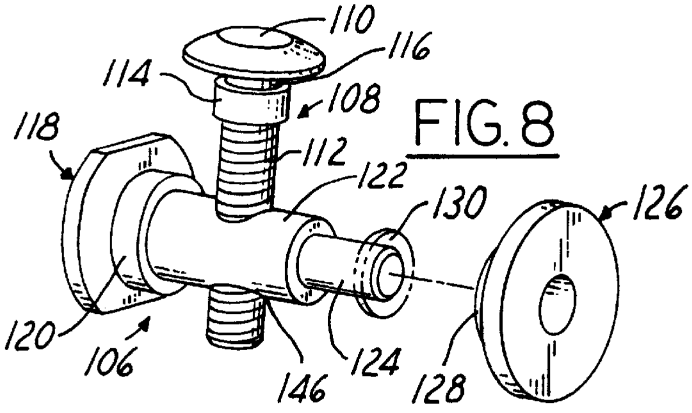

ONE STEP ADJUSTABLE DECK LID HINGE

TECHNICAL FIELD

The present invention relates generally to hinge assemblies for mounting deck lids to vehicle bodies, and more particularly, to a hinge assembly which adjusts the position of a deck lid so that the deck lid is flush and properly aligned with the quarter panels of a vehicle body when the deck lid is in a closed position.

BACKGROUND ART

Hinge assemblies swingably mount a closure such as a deck lid or hood relative to an opening in a vehicle between opened and closed positions. Known hinge assemblies include hinge boxes which are mounted to a part of the vehicle body, such as an inner shelf panel, horizontally disposed hinge pivot pins carried by the hinge boxes, and hinge straps having one end mounted to the deck lid and the other end pivotally connected to the hinge pins. The deck lid and the hinge straps pivot on a pivot axis defined by the hinge pins.

Known hinge assemblies further include an adjustment mechanism to adjust the deck lid side-to-side (horizontally) between the quarter panels and fore-and-aft of the quarter panels to properly position the deck lid relative to the deck lid opening of the vehicle. For instance, oversized or slotted holes in the deck lid or in the ends of the hinge straps mounted to the deck lid enable the deck lid to be shifted relative to the hinge straps. Once the deck lid is shifted to the proper position, fasteners extending through the holes which mount the hinge straps to the deck lid are tightened. Oversized holes in the inner shelf panel also allow horizontal and fore-and-aft adjustment of the deck lid by allowing movement of the hinge boxes prior to being fastened to the inner shelf panel.

In addition to horizontal and fore-and-aft adjustment, vertical adjustment is also needed to effect proper alignment and flushness of the deck lid with the quarter panels. Adjustable deck lid hinge assemblies which provide for vertical and fore-and-aft adjustment of the deck lid are shown in U.S. Pat. Nos. 5,158,333, 4,893,863 and others.

U.S. Pat. Nos. 5,158,333 and 4,893,863 disclose adjustable deck lid hinge assemblies which provide vertical translation of a hinge strap relative to the inner shelf panel of the vehicle. Accordingly, the forward portion of the deck lid mounted to the vehicle by such hinge assemblies can be vertically adjusted to flushly mate with the quarter panels of the vehicle.

A serious disadvantage associated with such patents is that when the pivot axis of the straps is only adjusted vertically, the deck lid and the deck lid latch at the rear of the deck lid move fore-and-aft relative to the deck lid striker and this can cause a failure of the latching action unless either the hinge straps are adjusted relative to the deck lid or the vertical position of the deck lid latch or the hinge boxes are adjusted fore-and-aft.

This fore-and-aft movement of the deck lid upon vertical adjustment of the pivot axis makes alignment of the deck lid difficult. Moving the hinge boxes or the hinge straps relative to either the deck lid or the deck lid latch after vertically adjusting the hinge assemblies are extra steps which take too much time and effort. In the high volume production environment in which the present invention is useful, extra steps are not trivial.

SUMMARY OF THE INVENTION

Accordingly, it is an object of the present invention to provide a vertically adjustable hinge assembly which vertically adjusts the position of a deck lid in one step, viz, without the need to make compensating adjustments in other locations because of the vertical adjustment.

Another object of the present invention is to provide an adjustable hinge assembly having an adjustment screw which does not intrude above the inner shelf panel of a vehicle as in U.S. Pat. No. 4,893,863.

It is a further object of the present invention to provide an adjustable hinge assembly having an adjustment screw which adjusts the position of a deck lid by moving the pivot pin along an arcuate path, or tangent to an arc, whose center is substantially at the deck lid striker.

It is still another object of the present invention to provide an adjustable hinge assembly having a hinge box which remains stationary while the vertical position of a deck lid is adjusted.

It is still a further object of the present invention to provide an adjustable hinge assembly having a pivot pin which self locks in place after adjustment to maintain the position of a deck lid.

It is still yet another object of the present invention to provide an adjustable hinge assembly which minimally intrudes in the space adjacent the inner shelf panel of a vehicle.

In carrying out the above objects and other objects and features, the present invention provides an adjustable hinge assembly for mounting a hinge strap of a deck lid to a vehicle body. The assembly permits rapid adjustment of the deck lid to properly fit the vehicle body. In combination, the assembly includes a hinge box for mounting to a vehicle body. The hinge box has spaced apart sides. The sides of the hinge box are shaped to provide aligned adjustment slots either formed on an arc or tangent to an arc whose center is at substantially the deck lid striker of the deck lid. The assembly further includes a pivot pin extending through the adjustment slots and upon which the deck lid is swingably mounted. The pivot pin is slidable in the adjustment slots and thereby moves either along the aforesaid arcuate path or tangent to the aforesaid arc.

The hinge strap has a proximal end for pivotal connection to the pivot pin. The assembly also includes an adjustment screw extending within the hinge box. The adjustment screw is connected to the hinge box and is threadingly engaged with the pivot pin. Rotation of the adjustment screw causes the pivot pin to slide along the adjustment slots thereby adjusting the position of the deck lid in relation to the vehicle body without moving the deck lid fore-and-aft. Thus, a proper fore-and-aft fit of the deck lid is maintained while the deck lid is vertically adjusted to achieve the desired flushness between the lid and adjacent body panels.

The advantages accruing to the present invention are numerous. After positioning the deck lid laterally and fore-and-aft in desired alignment with adjacent body panels, it can be adjusted vertically without disturbing such alignments in just one step by rotating the adjustment screw. Specifically, and in the preferred embodiment, rotation of the adjustment screw causes the pivot pin to move tangent to an arcuate path whose center is at the deck lid striker. Such movement of the pivot pin causes the hinge strap and the deck lid to move toward or away from the compartment opening without disturbing proper fore-and-aft position.

For instance, if the adjustment screw is rotated clockwise, then the deck lid moves away from the rear compartment opening. Similarly, if the adjustment screw is rotated counter-clockwise, then the deck lid moves toward the compartment. Both adjustments are accomplished without having to re-adjust the fore-and-aft position of the deck lid as with the prior art.

Furthermore, the adjustable hinge assembly has an adjustment screw and pivot pin combination which positions the deck lid without intruding above the inner shelf panel of the vehicle. The adjustment screw is configured to move the pivot pin up or down without having to extend above the inner shelf panel during rotation.

Also, the threaded engagement between the adjustment screw and the pivot pin assists in automatically securing or self locking the pivot pin in place after adjustment. Consequently, there is no need to perform additional steps of locking the pivot pin in place after adjustment.

These and other features, aspects, and embodiments of the present invention will become better understood with regard to the following description, appended claims, and accompanying drawings in which the same reference numerals are employed to designate corresponding parts throughout the several drawings.

BRIEF DESCRIPTION OF THE DRAWINGS

FIG. 5 is a side view of the adjustable hinge assembly;

FIG. 6 is a front view of the adjustable hinge assembly with a portion of the hinge strap cut away;

FIG. 7 is a cross-sectional view of the adjustable hinge assembly and a hinge strap;

FIG. 8 is a perspective view of the adjustment screw and a pivot pin used in an adjustable hinge assembly;

BEST MODES FOR CARRYING OUT THE INVENTION

Figure 1:
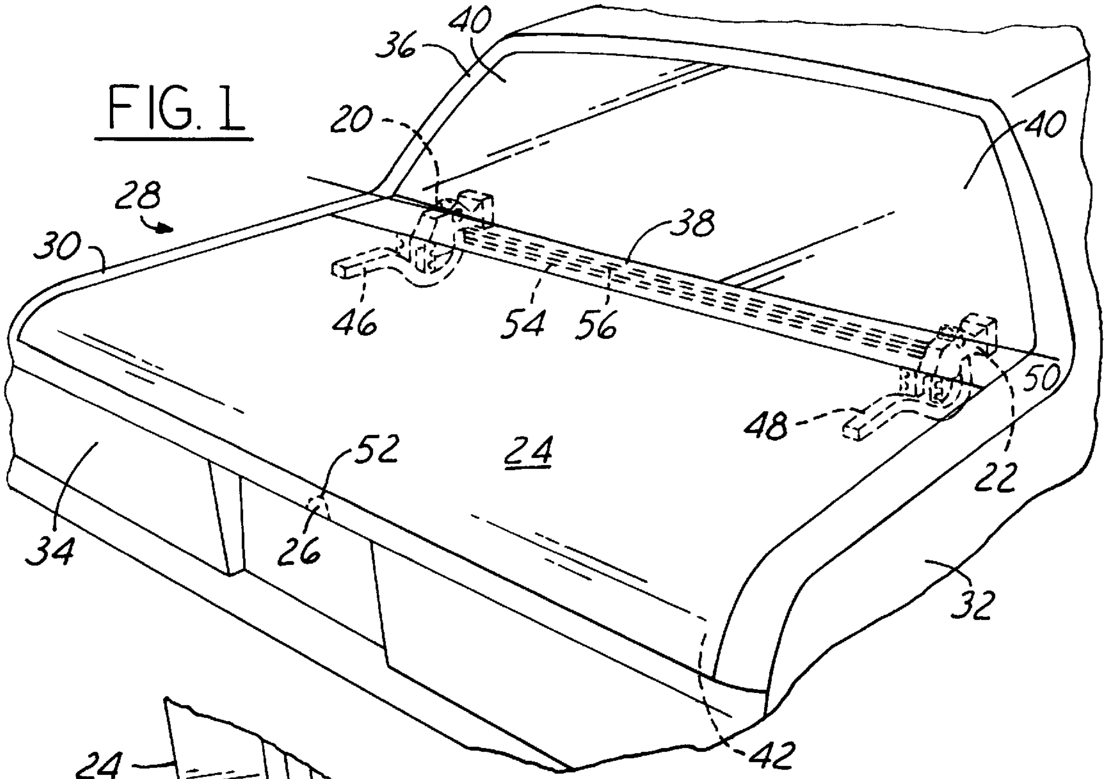
FIG. 1 is a fragmentary perspective rear view of a vehicle body which uses a pair of adjustable hinge assemblies made in accordance with the present invention for adjustably mounting a deck lid to a vehicle body.

Referring now to FIG. 1, a pair of adjustable deck lid hinge assemblies 20 and 22 made in accordance with the present invention are shown. Hinge assemblies 20 and 22 swingably mount a deck lid 24 to a vehicle 28. Vehicle 28 has a pair of side rear quarter panels 30 and 32, a rear portion 34, and a transverse body structure 36. Transverse body structure 36 defines a transversely extending generally horizontal support or an inner shelf panel 38. Vehicle 28 further includes a window opening 40 disposed above inner shelf panel 38. Side rear quarter panels 30 and 32, rear portion 34, and inner shelf panel 38 define an upwardly opening trunk compartment 42. A seal 44 (shown best in FIG. 2) surrounds the trunk compartment opening.

Deck lid 24 is supported by a pair of laterally spaced apart gooseneck-shaped hinge straps 46 and 48 which are pivotally connected to hinge assemblies 20 and 22 respectively. A horizontal pivot axis 50 extends laterally through hinge assemblies 20 and 22. Deck lid 24 swings about pivot axis 50 between a closed position to prevent access to trunk compartment 42, and an opened position (FIGS. 2 and 3) to expose the trunk compartment. Latching mechanism is provided for securing the rear of the deck lid over the trunk compartment 42. Such mechanism includes cooperating latch elements, one is mounted on the inside of the deck lid at the rear thereof, and the other designated 52 is mounted on the rear portion 34 of vehicle 28. One of these elements generally comprises a spring loaded, key or remotely operated, catch and the other a fixed loop to be caught and held by the spring loaded element. For purposes of this description and the claims, the rear portion 150 of the deck lid 24 is designated as the deck lid striker 26 (see FIG. 10).

A pair of torque springs 54 and 56 extend laterally between respective hinge assemblies 20 and 22 to bias deck lid 24 to the opened position when the deck lid is released from deck lid latch 52. Consequently, little effort is required to lift deck lid 24 to the fully opened position. Likewise, due to the weight of deck lid 24, only a small downward force is required to move the deck lid to the closed position.

Each of hinge assemblies 20 and 22 are generally identical. Thus, like features on each of hinge assemblies 20 and 22 will be identified with like reference numerals. For brevity, only hinge assembly 20 will be described in detail.

Figure 2:
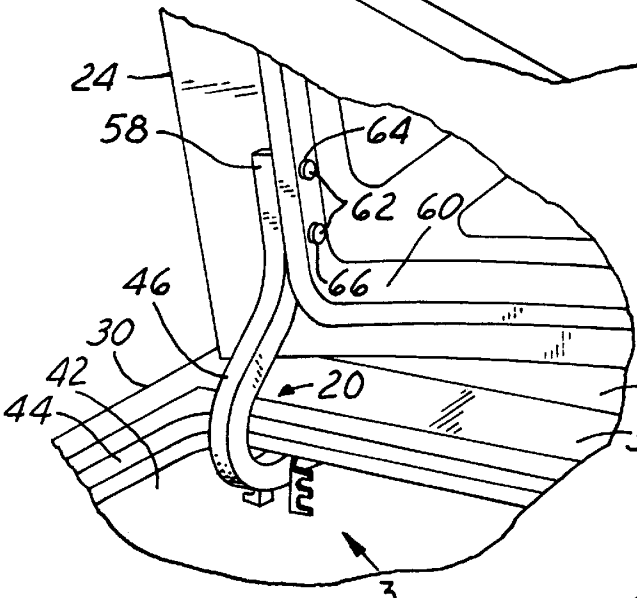
FIG. 2 is a fragmentary perspective view of the adjustable hinge assembly mounting a hinge strap and a deck lid to a vehicle body.
Figure 3:
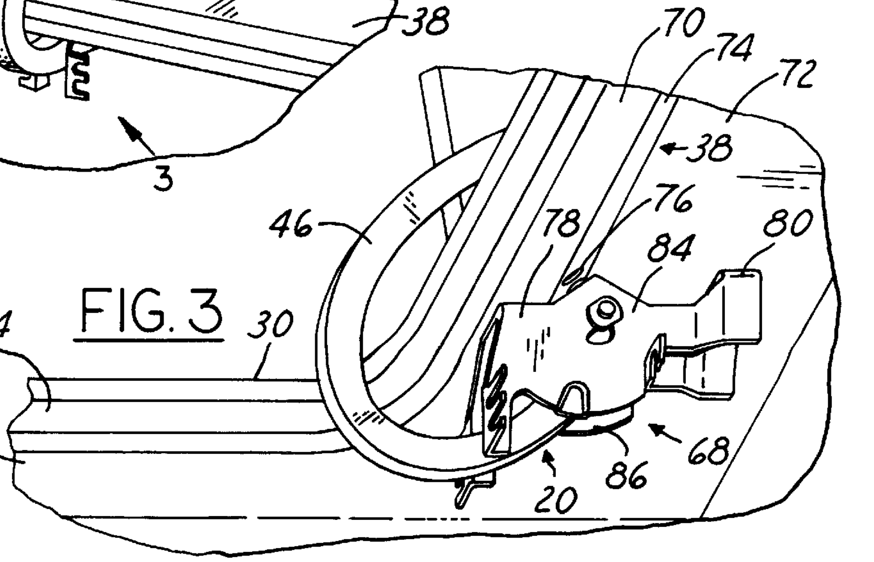
FIG. 3 is a fragmentary perspective view looking in the direction of arrows 3—3 in FIG. 2.

Referring now to FIGS. 2 and 3, a portion of deck lid 24 pivotally attached in the opened position by hinge assembly 20 to vehicle 28 is shown. A distal portion 58 of hinge strap 46 is mounted to a longitudinally extending U-shaped rib 60 of deck lid 24 via fasteners 62. Fasteners 62 extend from apertures 64 and 66 in U-shaped rib 60 through coaxially alignable apertures in distal portion 58 (not specifically shown)

FIG. 3 shows hinge assembly 20 mounted to inner shelf panel 38 of vehicle 28. Hinge assembly 20 includes a hinge box 68. Inner shelf panel 38 has a lower panel 70 and a higher panel 72. A diagonal panel 74 connects lower panel 70 to higher panel 72. Diagonal panel 74 has a rear glass access opening 76 for providing access to hinge box 68. In the particular embodiment shown, hinge box 68 includes a lower mounting portion 78 mounted to lower panel 70 and a higher mounting portion 80 mounted to higher panel 72. Apertures 88 and 90 are intended to have screw fasteners extending therethrough and into oversize holes in the panels 70 and 72 to allow fore-and-aft or lateral adjustment of the hinge boxes relative to the trunk compartment opening for adjusting the fore-and-aft and lateral position of the trunk lid over the opening so proper alignment is obtained in these directions.

Figure 4:
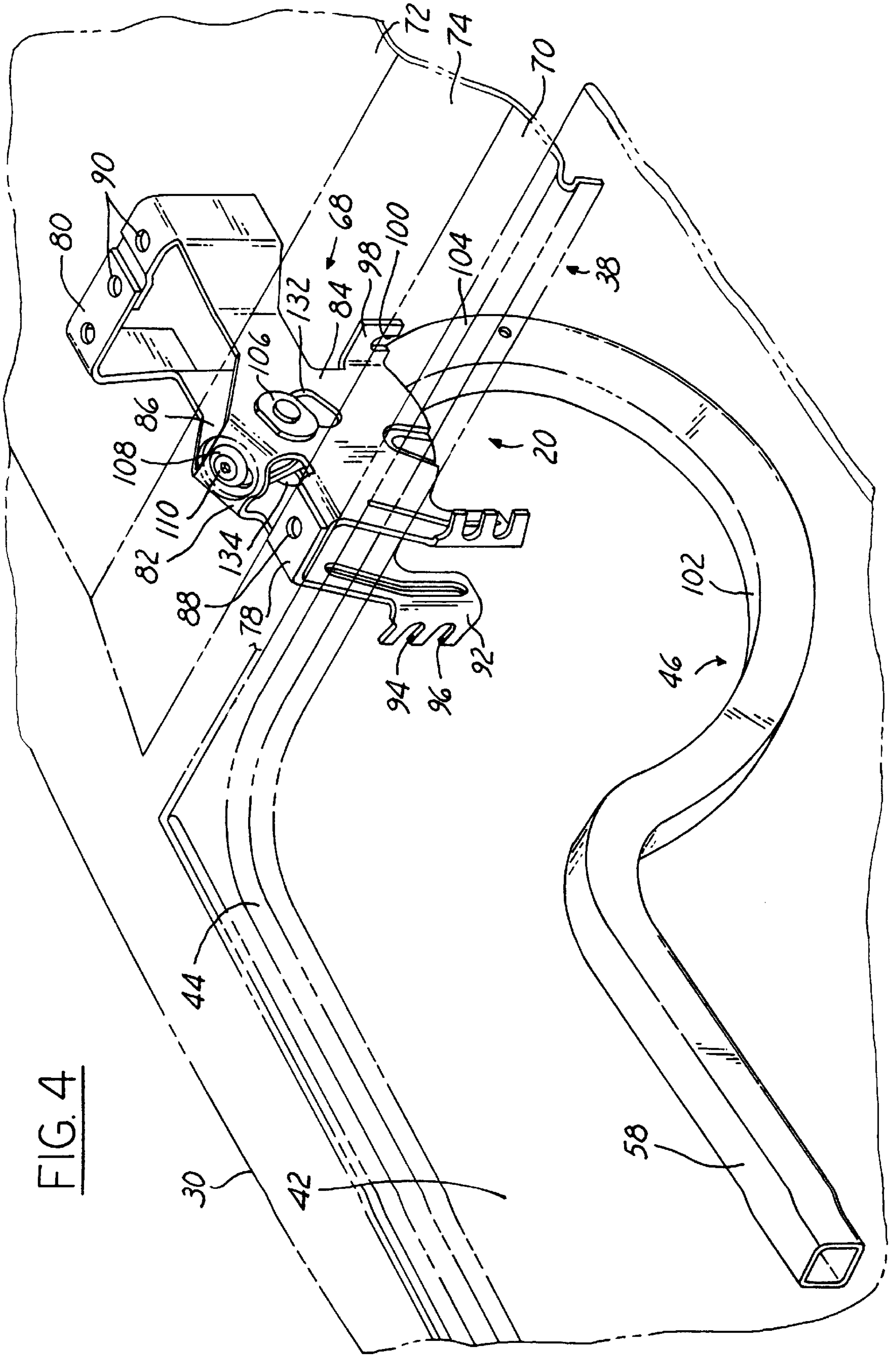
FIG. 4 is a perspective view of the adjustable hinge assembly mounted to an inner shelf panel of a vehicle body.

As best shown in FIGS. 3 and 4, hinge box 68 includes a top portion 82 and a pair of vertically extending sides 84 and 86 which depend downwardly from the top portion. Lower mounting portion 78 has a mounting aperture 88. Similarly, higher mounting portion 80 has mounting apertures 90. Sides 84 and 86 form a rear torque spring retaining wall 92 having notches 94 and 96. Sides 84 and 86 also form a front torque spring retaining wall 98 having a notch 100. Notches 94, 96, and 100 serve to anchor torque springs (not specifically shown). Hinge box 68 is a suitable sheet metal stamping, preferably made from steel, aluminum, or the like.

Hinge strap 46 includes distal portion 58, an intermediate gooseneck portion 102, and an elongate proximal portion 104. As described above, distal portion 58 mounts to deck lid 24. Gooseneck portion 102 has a curved shape to avoid interfering with inner shelf panel 38 when hinge strap 46 swingably moves deck lid 24 between opened and closed positions. Proximal portion 104 of hinge strap 46 is pivotally connected to a hinge pivot pin 106 in hinge box 68 to swingably mount deck lid 24 to vehicle 28 (see FIG. 9). Clearance slots 25 and 27 are provided in the proximal portion of the strap.

Referring now to FIGS. 6, 7, and 8 with continuing reference to FIGS. 4 and 5, hinge box 68 further includes an adjustment screw 108. Adjustment screw 108 extends within hinge box 68 between sides 84 and 86. Adjustment screw 108 includes a head portion 110 which extends through a keyhole slotted opening 111 in top portion 82 of hinge box 68 as shown in FIG. 4 and is configured so as to be trapped therein against axial movement during adjustment operations. Head portion 110 has a rotary tool receiving aperture 113 for receiving a rotary tool such as a screw driver. Access for rotating adjustment screw 108 is provided through rear glass opening 76 of diagonal panel 74 along inner shelf panel 38.

Adjustment screw 108 further includes a threaded body 112, and the head portion 110 has a shoulder 114 and a groove 116 (shown best in FIGS. 7 and 8). Opening 111 allows shoulder portion 114 to be inserted therethrough and groove portion 116 cooperates to prevent axial movement of adjustment screw 108 in the hinge box 68 during vertical adjustment of the deck lid.

Pivot pin 106 includes a flange 118 with successively reduced diameter portions 120, 122, and 124. A flanged washer having a flange 126 and a reduced diameter portion 128 is placed on the end 124 of pivot pin 106 opposite flange 118 and staked in place to hold the pin in the box.

Sides 84 and 86 of hinge box 68 have corresponding aligned adjustment slots 132 and 134, as shown in FIG. 5. Each adjustment slot 132 and 134 includes a wide mouth entry portion 136 and an elongated slot portion 138. Pivot pin 106 extends horizontally across hinge box 68 through adjustment slots 132 and 134. Portion 120 of pivot pin 106 and portion 128 of flange 126 engage edges of slot portions 138 and flanges 118 and 126 overlie marginal edges of the slot portions 138. Wide mouth entry portion 136 enables pivot pin 106 to be inserted and removed from sides 84 and 86 of hinge box 68.

Figure 10:
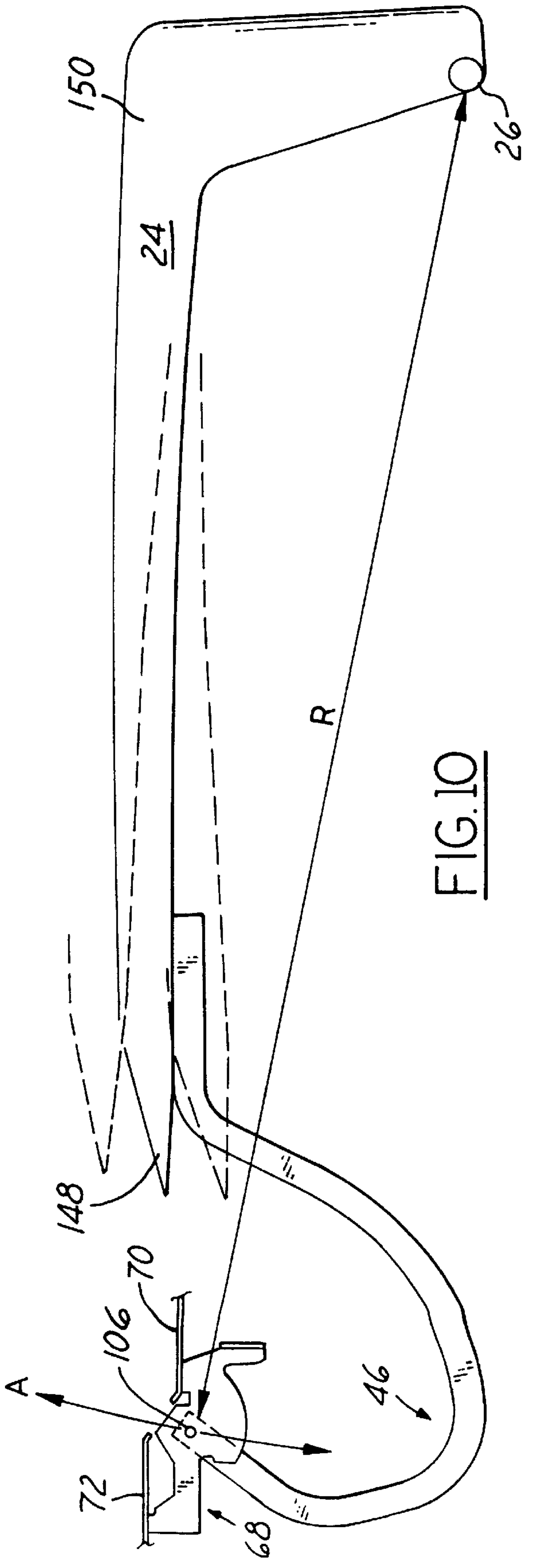
FIG. 10 is a schematic view of a deck lid being pivotally adjusted along a path T-T tangent to the arc A.

Pivot pin 106 is slidable within adjustment slots 132 and 134 along the path "T—T" formed by slots 138. The path T—T is preferably tangent to arc "A" whose radius "R" is centered at the deck lid striker 26, as best shown in FIG. 10. Path T—T may alternatively be coincident to arc A, though because A is so long and the limits of vertical adjustment so relatively small, having the slot portions 138 formed on an arc is unnecessary, and simply having slot portions straight or rectilinear on a tangent to arc A is quite satisfactory.

Figure 9:
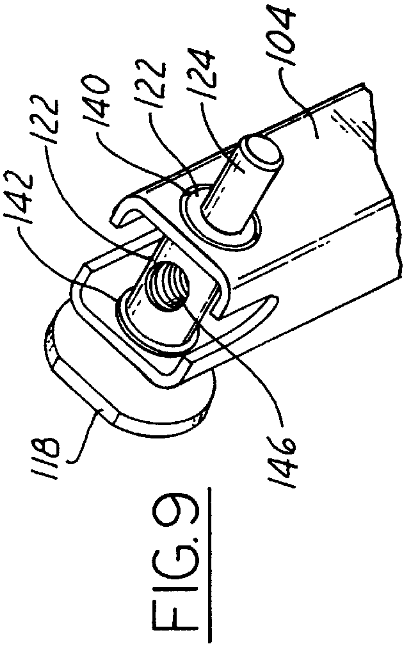
FIG. 9 is a view illustrating the pivotal connection between the hinge strap and the pivot pin.

As mentioned above, proximal portion 104 of hinge strap 46 is pivotally connected to pivot pin 106 (shown best in FIG. 9). Proximal portion 104 has coaxially alignable apertures 140 and 142 which fit over portion 122 of pivot pin 106. Proximal portion 104 can pivot about pivot pin 106, as shown in FIG. 7, to swingably move deck lid 24 between opened and closed positions. Preferably, bushings 144 are provided to reduce wear and friction as proximal portion 104 rotates about portion 122 of pivot pin 106. Bushings 144 are preferably made of Teflon.

When pivot pin 106 slides along the path T—T formed by adjustment slot portions 138 of the slots 132 and 134, proximal portion 104 of hinge strap 46 moves along the same path as does deck lid 24. Thus, the up and down position of deck lid 24 relative to the trunk compartment opening can be adjusted without disturbing the fore-and-aft adjustment of the deck lid relative to the trunk compartment opening. Thus, by first adjusting the lateral and fore-and-aft position of the trunk lid by moving the hinge boxes 68 as explained above, then the up and down position of the lid may be adjusted in one step.

As indicated in FIG. 10, if pivot pin 106 slides up adjustment slots 132 and 134, then leading portion 148 of deck lid 24 moves upwardly without affecting its position relative to the striker 26. Had pivot pin 106 been raised only in a vertical plane, as in prior art, U.S. Pat. Nos. 4,893,863, 5,074,609 or 5,365,639, then deck lid latch 52 located adjacent deck lid striker 26 would have to be readjusted, or the fore-and-aft positions of the hinge boxes or the relative positions of the hinge straps and the lid would have to be adjusted.

Similarly, if pivot pin 106 slides down adjustment slots 132 and 134, then leading portion 148 of deck lid 24 moves downwardly without disturbing the relationship between the deck lid and striker 26. Accordingly, there is no need to adjust deck lid latch 52 or adjust the fore-and-aft position of deck lid 24 relative to hinge strap 46 or the fore-and-aft position of hinge strap 46 relative to inner shelf panel 38 to obtain proper alignment as is the case in the prior art.

Adjustment screw 108 cooperates with pivot pin 106 so that rotation of the adjustment screw causes the pivot pin to slide along adjustment slots 132 and 134 thereby adjusting the position of deck lid 24. Adjustment screw 108 threadingly engages a transverse threaded bore 146 in pivot pin 106 to receive the external thread of adjustment screw 108.

Consequently, rotation of adjustment screw 108 in the clockwise direction causes pivot pin 106 to move up adjustment slots 132 and 134. Similarly, rotation of adjustment screw 108 in the counter-clockwise direction causes pivot pin 106 to move down adjustment slots 132 and 134. As described above, deck lid 24 moves in accordance to the movement of pivot pin 106 so that the vertical position of the deck lid can be properly adjusted by simply rotating adjustment screw 108. A slight thread mismatch between pivot pin 106 and adjustment screw 108 self locks the pivot pin in position.

Another advantage of the present invention is that adjustment screw 108 does not intrude above inner shelf panel 38. Adjustment screw 108 is anchored at all times, even during rotation, to top portion 82 of hinge box 68. Thus, rotation of adjustment screw 108 causes pivot pin 106 to move up and down the adjustment screw while the adjustment screw stays anchored to hinge box 68.

Adjustable hinge assemblies 20 and 22 of the present invention provide a simple method of mounting deck lid 24 to vehicle 28 to permit rapid adjustment of the deck lid to properly fit the vehicle. In operation, the method includes mounting deck lid 24 to hinge strap 46. Top portion 82 of hinge box 46 is then mounted to inner shelf panel 38 of vehicle 28. Proximal portion 104 of hinge strap 46 is then pivotally connected to pivot pin 106. Adjustment screw 108 is then rotated to cause pivot pin 106 to slide along the adjustment slots 132 and 134 thereby positioning deck lid 24 relative to vehicle 28.

It should be noted that the present invention may be used in a wide variety of different constructions encompassing many alternatives which are apparent to those with ordinary skill in the art. Accordingly, the present invention is intended to embrace all such alternatives, modifications, and variations as fall within the spirit and broad scope of the appended claims.

What is claimed is:

1. An adjustable hinge assembly for mounting a hinge strap of a deck lid to a vehicle body to permit rapid adjustment of the deck lid to properly fit the vehicle body, the assembly comprising:

a hinge box for mounting to a vehicle body and having spaced apart sides;

said sides of the hinge box being shaped to provide aligned adjustment slots extending tangent to or along an arc centered on a deck lid striker of the deck lid;

a pivot pin extending through the adjustment slots and being slidable therein;

said hinge strap having a proximal end for pivotal connection to the pivot pin; and an adjustment screw extending within the hinge box and connected thereto to be retained against axial displacement, the adjustment screw threadingly engaged with the pivot pin whereby rotation of the adjustment screw causes the pivot pin to slide along said adjustment slots while the adjustment screw is retained against axial displacement thereby vertically adjusting the position of the deck lid in relation to the vehicle body without requiring repositioning of the deck lid in relation to the vehicle body, wherein the threaded engagement between the adjustment screw and the pivot pin assists in automatically securing the pivot pin in place along the adjustment slots after adjustment of the deck lid.

2. The assembly of claim 1 wherein:

the hinge box has a portion for mounting the hinge box to an inner shelf panel of the vehicle body.

3. The assembly of claim 2 wherein:

the adjustment screw has a head portion extending through an opening in the hinge box and retained therein against axial displacement.

4. The assembly of claim 3 wherein:

the hinge box has a top portion with a key hole slot therein and the adjustment screw has a groove engaged with the keyed slot to connect the adjustment screw to the top portion of the hinge box against axial displacement.

5. The assembly of claim 2 wherein:

the adjustment screw is connected to a portion of the hinge box to prevent intrusion of the adjustment screw beyond the hinge box as the adjustment screw is rotated.

6. The assembly of claim 1 wherein:

the hinge box is a metal stamping.

7. The assembly of claim 1 wherein:

the pivot pin has a shoulder at each end and the adjustment slots are engaged with such shoulders of the pivot pin to secure, guide and position the pivot pin in the box while allowing the pivot pin to slide along the slots when the adjustment screw is rotated.

8. The assembly of claim 1 wherein:

the pivot pin has a transverse threaded bore threadingly engaged with the adjustment screw.

9. The assembly of claim 1 wherein:

the pivot pin extends horizontally through the adjustment slots.

10. The assembly of claim 1 wherein:

the adjustment screw is adapted to be rotated by a rotary tool.

11. In a vehicle body having a compartment, a compartment lid with a compartment lid striker, a pair of spaced apart hinge straps mounted to the compartment lid and having a proximal end for pivotal connection to a pivot pin, and a pair of adjustable hinge assemblies for swingably supporting the compartment lid over the compartment to permit rapid adjustment of the compartment lid to properly fit the vehicle body, each one of the pair of adjustable hinge assemblies comprising, in combination:

a hinge box having spaced apart sides and a top portion;

said sides of the hinge box being shaped to provide aligned adjustment slots formed on a tangent to an arc centered on the compartment lid striker;

a pivot pin extending through the adjustment slots and being slidable therein along the slots, the pivot pin being pivotally connected to one of the pair of hinge straps; and an adjustment screw extending within the hinge box through an opening in the top portion of the hinge box, the adjustment screw being threadingly engaged with the pivot pin at one end and connected at the other end to the top portion of the hinge box to be retained against axial displacement, whereby rotation of the adjustment screw causes the pivot pin to slide along said slots while the adjustment screw is retained against axial displacement thereby adjusting the vertical position of the compartment lid in relation to the vehicle body, wherein the threaded engagement between the adjustment screw and the pivot pin assists in automatically securing the pivot pin in place along the adjustment slots after adjustment of the compartment lid.

* * * * *